United States Patent
Li et al.

(10) Patent No.: US 10,530,961 B2
(45) Date of Patent: Jan. 7, 2020

(54) COPYING APPARATUS AND METHOD CAPABLE OF CALIBRATING COPY POSITION

(71) Applicant: AVISION INC., Hsinchu (TW)

(72) Inventors: Chen-Chang Li, Miaoli County (TW); Cheng Chen Tseng, Hsinchu County (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 15/597,748

(22) Filed: May 17, 2017

(65) Prior Publication Data

US 2017/0366704 A1 Dec. 21, 2017

(30) Foreign Application Priority Data

Jun. 17, 2016 (TW) .............................. 105119115 A

(51) Int. Cl.
*H04N 1/387* (2006.01)
*H04N 1/00* (2006.01)

(52) U.S. Cl.
CPC ....... *H04N 1/3872* (2013.01); *H04N 1/00355* (2013.01); *H04N 1/00376* (2013.01);
(Continued)

(58) Field of Classification Search
CPC ............... H04N 1/3872; H04N 1/3878; H04N 1/00368; H04N 1/00376; H04N 1/00803; H04N 1/00819; H04N 1/00968
(Continued)

(56) References Cited

U.S. PATENT DOCUMENTS 4,831,420 A * 5/1989 Walsh .................... G03G 15/55
271/226
5,729,350 A * 3/1998 Ozaki .................. G03G 15/507
358/296
(Continued)

FOREIGN PATENT DOCUMENTS

CN 1614987 A 5/2005
CN 1776715 A 5/2005
(Continued)

OTHER PUBLICATIONS

Taiwan Office Action with Search Report dated Apr. 20, 2018 issued in corresponding application TW106116250, 7 pages.

*Primary Examiner* — Jamares Q Washington
(74) *Attorney, Agent, or Firm* — Muncy, Geissler, Olds & Lowe, PC

(57) ABSTRACT

A copying apparatus capable of calibrating a copy position comprises a scanning module scanning an original to obtain an original image; and a processing module being electrically connected to the scanning module and recognizing whether the original image contains an original mark corresponding to a template mark. If the original image contains the original mark, then the processing module generates print data for being printed out according to the original image and a position parameter of the template mark. A copying method capable of calibrating the copy position is also provided. Thus, the copy position can be calibrated according to the mark of the original to prevent the copy result from having a positional offset. Consequently, no positional offset occurs even if the original is copied multiple times based on the previous generation of original.

17 Claims, 3 Drawing Sheets

(52) U.S. Cl.
CPC ..... *H04N 1/00803* (2013.01); *H04N 1/00819* (2013.01); *H04N 1/00968* (2013.01); *H04N 2201/0005* (2013.01); *H04N 2201/0094* (2013.01)

(58) Field of Classification Search
USPC ........................................................ 358/1.18
See application file for complete search history.

(56) References Cited

U.S. PATENT DOCUMENTS

| | | |
|---|---|---|
| 2006/0072179 A1 | 4/2006 | Caster et al. |
| 2008/0055388 A1* | 3/2008 | Klemer .................... B41J 2/471 347/233 |
| 2008/0278735 A1* | 11/2008 | Wang ........................ H04N 1/50 358/1.5 |
| 2009/0059249 A1 | 3/2009 | Izumiya et al. |
| 2016/0127605 A1 | 5/2016 | Sheng et al. |

FOREIGN PATENT DOCUMENTS

| | | |
|---|---|---|
| CN | 101334814 A | 12/2008 |
| JP | 2003156974 A | 5/2003 |
| TW | 201616851 A | 5/2016 |

\* cited by examiner

COPYING APPARATUS AND METHOD CAPABLE OF CALIBRATING COPY POSITION

This application claims priority of No. 105119115 filed in Taiwan R.O.C. on Jun. 17, 2016 under 35 USC 119, the entire content of which is hereby incorporated by reference.

BACKGROUND OF THE INVENTION

Field of the Invention

This disclosure relates to a copying apparatus and a copying method, and more particularly to a copying apparatus and a copying method capable of calibrating a copy position.

Description of the Related Art

When a conventional copier is copying, the original is scanned, and then the scanned result is printed on a medium. The copier performs the copy operation according to the scanned boundary. If the scanned boundary has an error or fluctuation, the copied result has the shifted position. Consequently, after the original is copied at the first time, a first error is generated in a first copy. A second error in a second copy (second generation of copy) is generated when the first copy is copied again, and the second accumulated error is the sum of the first error and the second error, so that the accumulated error is present, or even some contents may be cropped off after multiple generations of copying operations are performed. More particularly, when the user wants to fit the multi-generation of copied original with other contents, the fitting results may have errors.

SUMMARY OF THE INVENTION

It is therefore an object of this disclosure to provide a copying apparatus and a copying method capable of calibrating a copy position, wherein a position of a copied original is calibrated according to a parameter of a mark of the original to prevent a significant position error from being generated on the multi-generation of copied original.

To achieve the above-identified object, this disclosure provides a copying apparatus comprising: a scanning module scanning an original to obtain an original image; and a processing module, which is electrically connected to the scanning module and recognizes whether the original image contains an original mark corresponding to a template mark or not. If the original image contains the original mark, then the processing module generates print data for being printed out according to the original image and a position parameter of the template mark.

In addition, this disclosure also provides a copying method used in a copying apparatus, the copying method comprising the following steps: scanning an original to obtain an original image; recognizing whether the original image contains an original mark corresponding to a template mark or not; and generating print data for being printed out according to the original image and a position parameter of the template mark.

With the above-mentioned embodiment of this disclosure, the copy position can be calibrated according to the mark of the original to prevent the copy result from having a positional offset. Consequently, no positional offset occurs even if the original is copied multiple times based on the previous generation of original. Such the design is very useful for the occasion where table-fitting printing is needed because no incorrect table-fitting printing occurs. In addition, one company or organization may have a specific mark (in the text or graphic format) to calibrate the copy result. Furthermore, the user can set the position parameter(s) of the mark(s), or the copier may directly scan a template or templates to establish the database for the position parameters so that the copier can automatically calibrate various originals.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
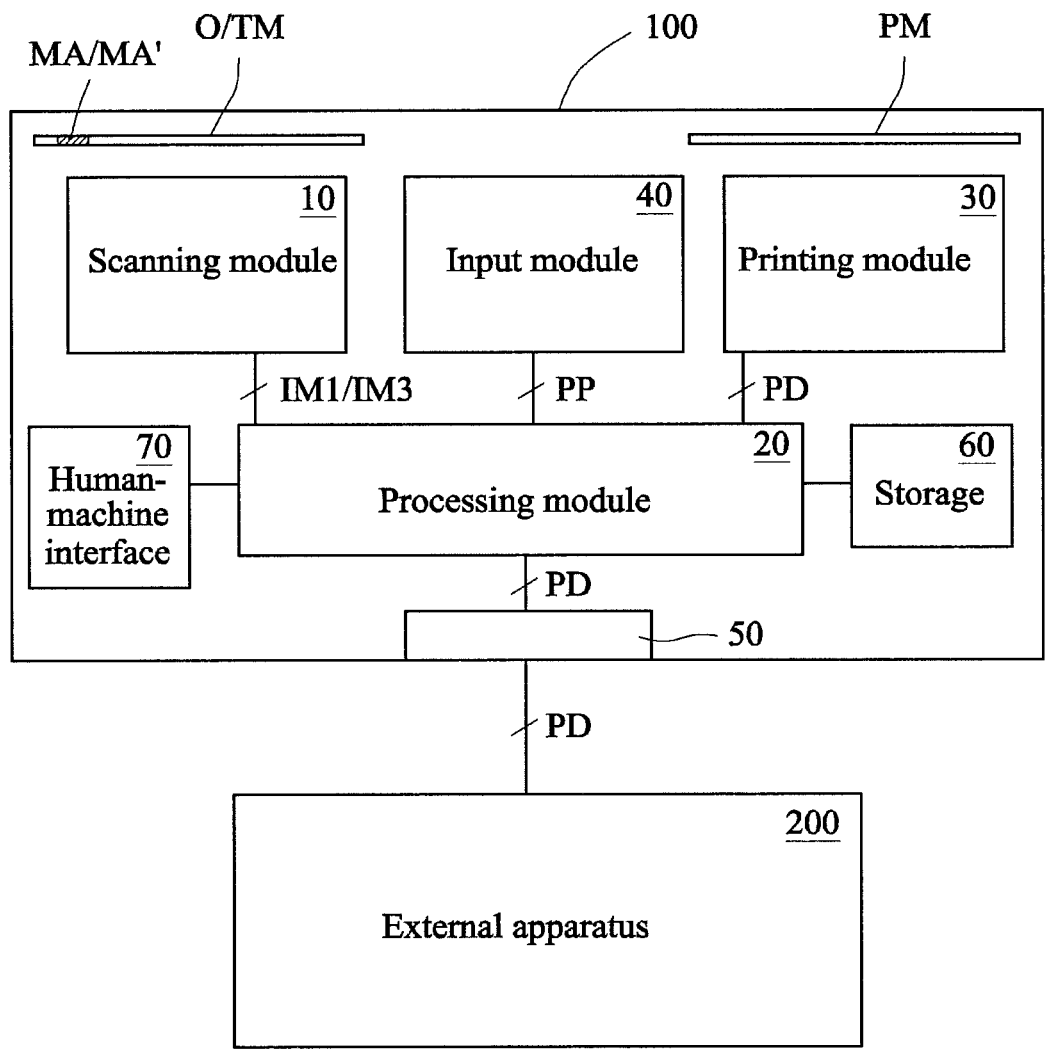
FIG. 1 is a schematic block diagram showing a copying apparatus according to a preferred embodiment of this disclosure.

FIG. 1 is a schematic block diagram showing a copying apparatus according to a preferred embodiment of this disclosure. As shown in FIG. 1, a copying apparatus 100 of this embodiment includes a scanning module 10, a processing module 20, a printing module 30, an input module 40 and a connection port 50. It is worth noting that only the scanning module 10 and the processing module 20 are needed to achieve the basic effect of this disclosure.

The scanning module 10 scans an original O to obtain an original image IM1. The scanning module 10 may be a scanning module of a scanner using a charge-coupled device (CCD) type image sensor or a contact image sensor (CIS) capable of performing a flatbed scan or sheet-fed scan to acquire an image of a A3 or A4 size document, or an image of a card-type document, such as an identity card.

The processing module 20 may be a processor of a multi-function peripheral or scanner, is electrically connected to the scanning module 10, and recognizes whether the original image IM1 contains an original mark MA', which corresponds to (is the same as, is similar to or matches with) a template mark MA, or not. The types of the marks MA include, without limitation to, the graphic or text image. The mark MA may be a black-and-white mark or a color mark. For example, if there is only a purple portion on the original O, then this portion may be regarded as the mark so that the designer or user has the diversified options. The mark MA' is preferable disposed on a periphery portion of the original image IM1 without affecting the main contents in the middle portion of the original image IM1.

If the original image IM1 contains the template mark MA, then the processing module 20 generates the print data PD for being printed out according to the original image IM1 and a position parameter PP of the template mark MA. The print data PD may be the data that can be directly received and printed by an ordinary printer without further processing. The template mark MA and its position parameter PP may be stored in a storage 60 of the copying apparatus 100 in the format of (the shape of the mark, the dimensions of the mark, and the coordinates (the position parameter) of one corner point of the mark, for example. In one example, the processing module 20 calculates an offset (may be a vector) of the original image IM1 according to the original image IM1 and the position parameter PP, and generates the print data PD according to the offset and the original image IM1. That is, the print data PD can be generated without a position shifting process being performed on the original image IM1. In another example, the processing module 20 performs a position shifting process on the original image IM1 according to the offset to generate a shifting-processed original image, and generates the print data PD according to the shifting-processed original image, so that a portion of the print data PD corresponding to the template mark MA has the position parameter PP. The shifting-processed original image may also be stored in the storage 60 so that it can be transmitted to the cloud or external device. In one example, the shifting-processed original image and the print data PD may be outputted to an external apparatus 200, which can print and store the print data PD. In another example, the offset, the shifting-processed original image and the print data PD may be outputted to the external apparatus 200 for further processing and storage. In still another example, the offset may be displayed on a human-machine interface (e.g., a display) 70 of the copying apparatus 100 to make the user know the offset.

The printing module 30 may be a printing engine of an ink-jet printer, a laser printer, a dot-matrix type printer or a thermal-induction printer and is electrically connected to the processing module 20, and prints the print data PD on a print medium PM.

In addition, the processing module 20 may have a database storing various types of template marks and various position parameters of the template marks. Consequently, one single copying apparatus can calibrate the copy positions of various originals. The types of the template marks and the position parameters thereof can be inputted through the scanning module 10. In this case, the scanning module 10 scans a template TM to obtain a template image IM3, and the processing module 20 processes the template image IM3 to generate the template mark MA and the position parameter PP of the template mark MA, wherein the template mark MA is selected by the user, or by the processing module 20 according to a built-in ordinary template mark database. For example, the graphic or text image, such as four corners of a table, a bar code, a specific text or specific texts (e.g., the title of the organization), can be selected as the template mark. When the scanning module 10 scans more templates TM, the processing module 20 can store the databases corresponding to more templates TM to achieve the learning function.

In addition, the types of the template marks and the position parameters thereof may also be inputted by the user through the input module 40 electrically connected to the processing module 20. The processing module 20 receives the position parameter PP from the input module 40. The input module 40 may be, for example, a numeric keyboard, a touch screen or the like. In addition, the user may also connect an external apparatus 200 to the copying apparatus 100 through the connection port 50 to perform the inputting of the types of the template marks and the position parameters thereof. Thus, the copying apparatus 100 does not necessarily have the input module 40. In this case, the external apparatus 200 may be a computer, a mobile device or the like, and the print data PD may be transmitted back to the external apparatus 200 so that the user can carry the external apparatus 200 stored with the print data PD to another place to print the print data. In another case, the external apparatus 200 may be a printer, which receives the print data PD and prints the print data PD on a medium. Thus, the copying apparatus 100 does not necessarily have the printing module 30.

Figure 2:
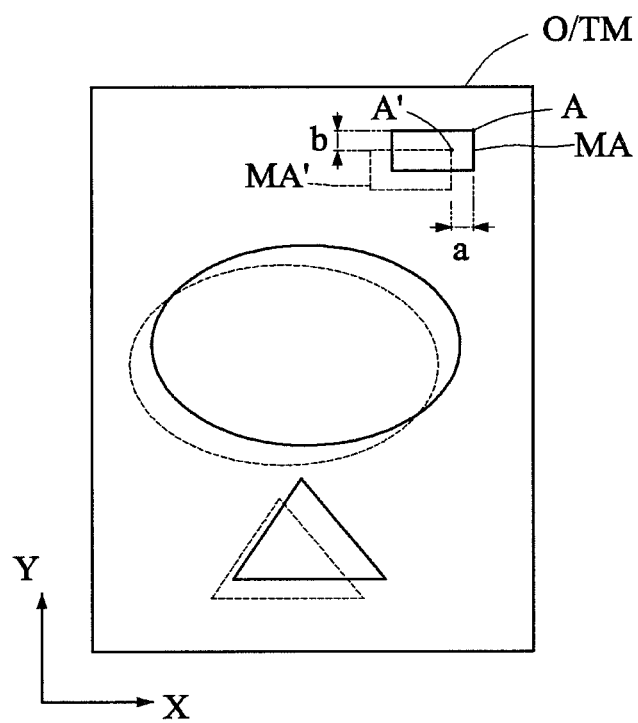
FIG. 2 is a schematic view showing the original, wherein a dashed-line portion represents an image of the original, and a solid-line portion represents a template image.

FIG. 2 is a schematic view showing the original, wherein a dashed-line portion represents an image of the original, and a solid-line portion represents a template image. In FIG. 2, the distances of the coordinate differences between a point A of the template mark MA of the template TM and a point A' of the original mark MA' of the original O are "a" and "b," respectively. Thus, the processing module 20 needs to move the original image IM1 of the original O in the positive X direction by the distance "a," and in the positive Y direction by the distance "b". That is, the original image IM1 is translated or shifted in the two-dimensional manner to generate the shifting-processed original image. It is worth noting that when the coordinate system changes, the original image IM1 can be moved in the directions of the coordinate axes. The print medium PM of FIG. 3 can be produced according to the shifting-processed original image. If the original image is directly processed, a distance difference between the mark (the position thereof corresponds to the original mark MA') of the produced print medium PM' and the mark (the position thereof corresponds to the template mark MA) of the print medium PM is present.

Figure 3:
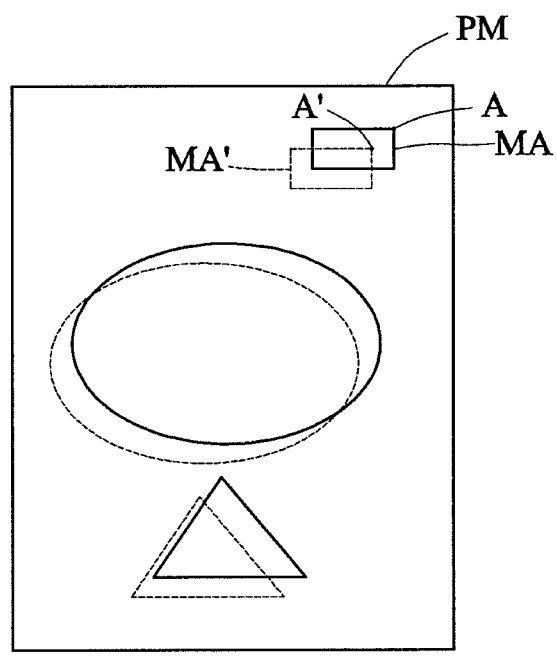
FIG. 3 is a schematic view showing a print medium, wherein a dashed-line portion represents the result obtained without the position calibration, and the solid-line portion represents the result obtained with the position calibration.

For example, if the original image IM1 contains the original mark MA', then the processing module 20 calculates the offset according to the position parameter PP (e.g., coordinates (190, 270) representing that the point A is located at (190, 270)) of the template mark MA. For example, the point A' of the original mark MA' is calculated to have the coordinates of (180, 260), and the offset is calculated as the movement of 10 units in the positive X direction and the movement of 10 units in the positive Y direction). In addition, the processing module 20 performs the position shifting process on the original image IM1 according to the offset and thus generates the shifting-processed original image, and generates the print data PD according to the shifting-processed original image. Thus, one portion of the print data PD corresponding to the template mark MA has the position parameter PP (e.g., (190, 270)). Therefore, the image of the print medium PM printed according to the print data PD after the print data PD is generated by the processing module 20 according to the original image IM1 and the position parameter PP of the template mark MA is representative of the original image and shifted by a distance relatively to the original image, as shown in FIG. 3. That is, the image of the print medium PM after being shifted by the distance relatively to the original image coincides with the original image.

Figure 4:
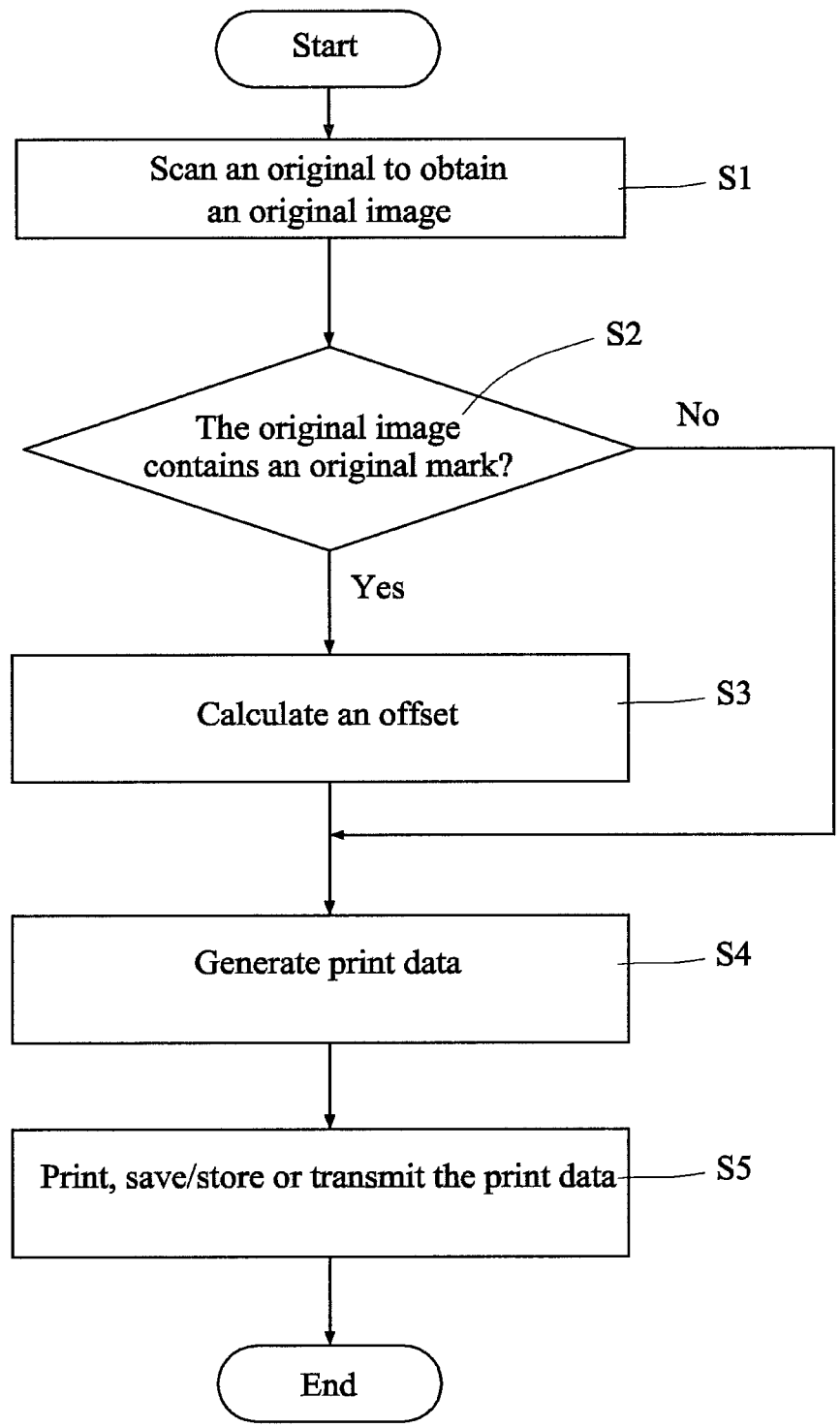
FIG. 4 is a flow chart showing a copying method according to the preferred embodiment of this disclosure.

FIG. 4 is a flow chart showing a copying method according to the preferred embodiment of this disclosure. As shown in FIG. 4, the copying method of this embodiment comprises the following steps.

In step S1, the original O is scanned to obtain the original image IM1.

In step S2, whether the original image IM1 contains an original mark MA', which corresponds to the template mark MA, or not is recognized or determined. If the original image IM1 contains the original mark MA', then steps S3 and S4 are performed to generate the print data PD according to the original image IM1 and the position parameter PP of the template mark MA. In the step S3, the offset is firstly calculated, and then the print data PD is generated according to the offset and the original image IM1. Alternatively, the position shifting process may also be performed according to position parameter PP and original image IM1 to generate the shifting-processed original image, and the step S4 is performed to generate the print data PD according to the shifting-processed original image. If the original image IM1 does not contain the original mark MA', then the step S4 is directly performed to generate another print data PD according to the original image IM1.

Finally, in step S5, the print data PD is printed, saved/stored or transmitted, as mentioned hereinabove.

With the above-mentioned embodiment of this disclosure, the copy position can be calibrated according to the mark of the original to prevent the copy result from having a positional offset. Consequently, no positional offset occurs even if the original is copied multiple times based on the previous generation of original. Such the design is very useful for the occasion where table-fitting printing is needed because no incorrect table-fitting printing occurs. In addition, one company or organization may have a specific mark (in the text or graphic format) to calibrate the copy result. Furthermore, the user can set the position parameter(s) of the mark(s), or the copier may directly scan a template or templates to establish the database for the position parameters so that the copier can automatically calibrate various originals.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A copying apparatus, comprising:
   a scanning module scanning an original to obtain an original image; and
   a processing module, which is electrically connected to the scanning module and recognizes whether the original image contains an original mark, which corresponds to a template mark, or not, wherein
   if the original image contains the original mark, then the processing module calculates an offset between the original mark of the original image of the original scanned by the scanning module and the template mark of a template image of a template having a position parameter, and generates print data for being printed out according to the original image of the original scanned by the scanning module and the offset, so that an image of a print medium printed according to the print data after the print data is generated by the processing module according to the original image and the offset is representative of the original image of the original scanned by the scanning module and shifted by the offset relatively to the original image of the original scanned by the scanning module.

2. The copying apparatus according to claim 1, further comprising:
   a printing module, which is electrically connected to the processing module and prints the print data on the print medium, wherein the image of the print medium after being shifted by the offset relatively to the original image coincides with the original image.

3. The copying apparatus according to claim 1, wherein the processing module calculates the offset according to the original image and the position parameter stored in the copying apparatus, and generates the print data for being printed out according to the offset and the original image.

4. The copying apparatus according to claim 3, wherein the processing module performs a position shifting process on the original image according to the offset to generate a shifting-processed original image, and generates the print data for being printed out according to the shifting-processed original image.

5. The copying apparatus according to claim 1, wherein the scanning module scans the template to obtain the template image, and the processing module processes the template image to generate the template mark and the position parameter of the template mark.

6. The copying apparatus according to claim 1, further comprising:
   an input module electrically connected to the processing module, wherein the processing module receives the position parameter from the input module.

7. The copying apparatus according to claim 1, wherein if the original image does not contain the original mark, then the processing module processes the original image to generate another print data for being printed out.

8. A copying method used in a copying apparatus, the copying method comprising steps of:
   scanning an original to obtain an original image;
   recognizing whether the original image contains an original mark, which corresponds to a template mark, or not; and
   calculating an offset between the original mark of the original image of the original scanned by a scanning module of the copying apparatus and the template mark of a template image of a template having a position parameter, and generating print data for being printed out according to the original image of the original scanned by the scanning module and the offset, so that an image of a print medium printed according to the print data after the print data is generated by a processing module of the copying apparatus according to the original image and the offset is representative of the original image of the original scanned by the scanning module and shifted by the offset, relatively to the original image of the original scanned by the scanning module.

9. The copying method according to claim 8, further comprising a step of:
   printing the print data on the print medium, wherein the image of the print medium after being shifted by the offset relatively to the original image coincides with the original image.

10. The copying method according to claim 8, wherein the offset is calculated according to the original image and the position parameter stored in the copying apparatus, and the print data for being printed out is generated according to the offset and the original image.

11. The copying method according to claim 10, wherein a position shifting process is performed on the original image according to the offset to generate a shifting-processed original image, and the print data for being printed out is generated according to the shifting-processed original image.

12. The copying method according to claim 8, further comprising steps of:
   scanning the template to obtain the template image; and
   processing the template image to generate the template mark and the position parameter of the template mark.

13. The copying method according to claim 8, further comprising a step of:

receiving the position parameter from an input module.

14. The copying method according to claim 8, wherein whether the original image contains the original mark is recognized after the original is scanned and before the print data for being printed out to obtain the image of the print medium representative of the original image and shifted by the offset relatively to the original image is generated.

15. The copying apparatus according to claim 1, wherein whether the original image contains the original mark is recognized after the original is scanned and before the print data for being printed out to obtain the image of the print medium representative of the original image and shifted by the offset relatively to the original image is generated.

16. The copying apparatus according to claim 1, wherein the offset is displayed on a human-machine interface of the copying apparatus to make a user know the offset.

17. The copying apparatus according to claim 4, wherein the offset, the shifting-processed original image and the print data are outputted to an external apparatus for further processing and storage.

* * * * *